(12) United States Patent
Tang

(10) Patent No.: US 12,189,992 B2
(45) Date of Patent: Jan. 7, 2025

(54) METHOD AND APPARATUS FOR READING AND WRITING DATA

(71) Applicants: JINGDONG TECHNOLOGY INFORMATION TECHNOLOGY CO., LTD., Beijing (CN); JINGDONG TECHNOLOGY HOLDING CO., LTD., Beijing (CN)

(72) Inventor: Zhentian Tang, Beijing (CN)

(73) Assignees: JINGDONG TECHNOLOGY INFORMATION TECHNOLOGY CO., LTD., Beijing (CN); JINGDONG TECHNOLOGY HOLDING CO., LTD., Beijing (CN)

( * ) Notice: Subject to any disclaimer, the term of this patent is extended or adjusted under 35 U.S.C. 154(b) by 6 days.

(21) Appl. No.: 18/003,845

(22) PCT Filed: Jun. 21, 2021

(86) PCT No.: PCT/CN2021/101193
§ 371 (c)(1),
(2) Date: Dec. 29, 2022

(87) PCT Pub. No.: WO2022/001718
PCT Pub. Date: Jun. 1, 2022

(65) Prior Publication Data
US 2023/0251796 A1    Aug. 10, 2023

(30) Foreign Application Priority Data

Jun. 30, 2020   (CN) .......................... 202010623609.X

(51) Int. Cl.
*G06F 3/06* (2006.01)

(52) U.S. Cl.
CPC .......... *G06F 3/0659* (2013.01); *G06F 3/0604* (2013.01); *G06F 3/064* (2013.01); *G06F 3/067* (2013.01)

(58) Field of Classification Search
None
See application file for complete search history.

(56) References Cited

U.S. PATENT DOCUMENTS

| 9,916,112 B1 | 3/2018 | Taylor et al. | |
| 10,860,259 B1* | 12/2020 | Winarski | G06F 12/121 |
| 2005/0223156 A1* | 10/2005 | Lubbers | G06F 3/0683 |
| | | | 711/100 |

(Continued)

FOREIGN PATENT DOCUMENTS

| CN | 109947703 A | 6/2019 |
| CN | 110096542 A | 8/2019 |

(Continued)

OTHER PUBLICATIONS

International Search Report and Written Opinion issued in corresponding PCT Application No. PCT/CN2021/101193, dated Sep. 27, 2021.

(Continued)

*Primary Examiner* — Yaima Rigol
(74) *Attorney, Agent, or Firm* — Westbridge IP LLC

(57) ABSTRACT

Disclosed are a method and an apparatus for reading and writing data. The method includes: determining a target data block cluster space a target data block to be read and written belongs to; determining a target storage address corresponding to the target data block according to a starting address of the data block cluster space, a spatial size of the block nodes in the data block cluster space and a block index of the target data block; and performing reading operation or writing operation on the target data block according to the target storage address.

7 Claims, 3 Drawing Sheets

(56) References Cited

U.S. PATENT DOCUMENTS

| | | | |
|---|---|---|---|
| 2005/0235127 A1* | 10/2005 | Muthiah | G06F 11/3648 |
| | | | 711/170 |
| 2010/0153660 A1* | 6/2010 | Lasser | G06F 12/0246 |
| | | | 711/E12.001 |
| 2011/0080956 A1 | 4/2011 | Zhou et al. | |
| 2013/0227207 A1 | 8/2013 | Katz et al. | |
| 2013/0254459 A1 | 9/2013 | Laplace et al. | |
| 2017/0212680 A1 | 7/2017 | Waghulde | |
| 2019/0268141 A1* | 8/2019 | Pandurangan | G06F 21/76 |
| 2019/0278506 A1 | 9/2019 | Richardson et al. | |
| 2019/0294822 A1* | 9/2019 | Hennebert | G06F 21/602 |
| 2019/0305959 A1* | 10/2019 | Reddy | G06F 8/73 |
| 2019/0306190 A1 | 10/2019 | Suraparaju | |
| 2021/0099309 A1* | 4/2021 | Winarski | H04L 67/1097 |
| 2021/0157797 A1* | 5/2021 | Dutchak | G06Q 20/3678 |

FOREIGN PATENT DOCUMENTS

| | | |
|---|---|---|
| CN | 110134323 A | 8/2019 |
| CN | 110149803 A | 8/2019 |
| CN | 110263014 A | 9/2019 |
| CN | 111339106 A | 6/2020 |
| CN | 111782656 A | 10/2020 |
| JP | H07262059 A | 10/1995 |
| WO | 2005055064 A1 | 6/2005 |
| WO | 2020041928 A1 | 3/2020 |

OTHER PUBLICATIONS

First Office Action issued in counterpart Chinese Patent Application No. 202010623609.X, dated Jul. 28, 2023.

Notice of Reasons for Refusal issued in counterpart Japanese Patent Application No. JP 2022-581690, dated Apr. 23, 2024.

Notification to Grant Patent Right for Invention issued in counterpart Chinese Patent Application No. 202010623609.X, dated Feb. 8, 2024.

Wu et al., Survey of Oblivious RAM, Journal of Software, 2018, 29(9), pp. 2753-2777, dated Sep. 15, 2018.

Extended European Search Report issued in counterpart Europe Patent Application No. 21832633.8, dated Jul. 2, 2024.

* cited by examiner ated, indexed and stored in the form of Key-Value. When storing blockchain data, a key-value pair is established for each block, where a hash value of the block
METHOD AND APPARATUS FOR READING AND WRITING DATA

CROSS-REFERENCE TO RELATED APPLICATIONS

This application is the National Stage of International Application No. PCT/CN2021/101193, filed on Jun. 21, 2021, which claims priority to Chinese Patent Application No. 202010623609. X, entitled "METHOD AND APPARATUS FOR READING AND WRITING DATA" and filed with China National Intellectual Property Administration on Jun. 30, 2020, all contents of which are incorporated herein by reference.

TECHNICAL FIELD

The present disclosure generally relates to the field of data storage, and in particular relates to a method and an apparatus for reading and writing data.

BACKGROUND

At present, blockchain storage mostly adopts memory block data, and stores blockchain data in KV database or file. Taking KV database as an example, KV database is a kind of database organized, indexed and stored in the form of Key-Value. When storing blockchain data, a key-value pair is established for each block, where a hash value of the block is stored in Key and the data of the block is stored in Value. When retrieving blockchain data, key-value pairs are traversed according to the hash value of the blockchain data to be retrieved, and a corresponding Value is found, that is, the blockchain data. It can be seen that in the current way, the efficiency of blockchain data retrieval is relatively low.

SUMMARY

In one aspect, the present disclosure relates to a method for reading and writing data, the method is applied to an electronic device, a designated physical storage space of the electronic device is divided into at least one data block cluster space, each data block cluster space comprises a plurality of block nodes, each block node is used for storing a data block, the method includes:
  determining a target data block cluster space a target data block to be read and written belongs to;
  determining a target storage address corresponding to the target data block according to spatial information of the target data block cluster space and a block index of the target data block, wherein the target data block comprises a blockchain; and
  performing reading operation or writing operation on the target data block according to the target storage address.

In some embodiments, the method further includes:
  recording spatial information of the data block cluster space at a designated location of the designated storage space; the spatial information at least comprises a cluster index of the data block cluster space, a starting address of the data block cluster space, a spatial size of the block nodes in the data block cluster space, and a quantity of the block nodes included in the data block cluster space.

In some embodiments, determining the target data block cluster space the target data block to be read and written belongs to includes:
  determining a data block cluster space designated by a user as the target data block cluster space the target data block to be read and written belongs to; or, determining a pre-designated data block cluster space as the target data block cluster space the target data block to be read and written belongs to when a data block cluster space designated by the user does not exist.

In some embodiments, determining the target storage address corresponding to the target data block according to spatial information of the target data block cluster space includes:
  calculating a product of a spatial size of the block nodes in the target data block cluster space and the block index of the target data block; and
  calculating a sum of a starting address of target data block cluster space and the product, determining a calculation result as the target storage address corresponding to the target data block.

In some embodiments, each data block cluster space comprises the same number of block nodes, or each data block cluster space includes different numbers of block nodes; and
  a spatial size of block nodes included in each data block cluster space is the same.

In some embodiments, block nodes in one same data block cluster space are used for storing data blocks of one same acquisition point.

In another aspect, the present disclosure relates to an apparatus for reading and writing data, applied to an electronic device, wherein a designated physical storage space of the electronic device is divided into at least one data block cluster space, each data block cluster space comprises a plurality of block nodes, each block node is used for storing a data block, the apparatus includes:
  a first determination module, configured for determining a target data block cluster space a target data block to be read and written belongs to;
  a second determination module, configured for determining a target storage address corresponding to the target data block according to spatial information of the target data block cluster space and a block index of the target data block; and
  an operation module, configured for performing reading operation or writing operation on the target data block according to the target storage address.

In some embodiments, the apparatus further includes:
  a recording module, configured for recording spatial information of the data block cluster space at a designated location of the designated storage space; the spatial information at least comprises a cluster index of the data block cluster space, a starting address of the data block cluster space, a spatial size of the block nodes in the data block cluster space, and a quantity of the block nodes included in the data block cluster space.

In some embodiments, the first determination module is configured for:
  determining a data block cluster space designated by a user as the target data block cluster space the target data block to be read and written belongs to; or, determining a pre-designated data block cluster space as the target data block cluster space the target data block to be read and written belongs to when a data block cluster space designated by the user does not exist.

In some embodiments, the second determination module includes:

a first calculation sub-module, configured for calculating a product of a spatial size of the block nodes in the target data block cluster space and the block index of the target data block; and a second calculation sub-module, configured for calculating a sum of a starting address of target data block cluster space and the product, determining a calculation result as the target storage address corresponding to the target data block.

In some embodiments, each data block cluster space comprises the same number of block nodes, or each data block cluster space comprises different numbers of block nodes; and a spatial size of block nodes included in each data block cluster space is the same.

In some embodiments, block nodes in one same data block cluster space are used for storing data blocks of one same acquisition point.

In yet another aspect, the present disclosure relates to an electronic device, which includes: a processor and a memory, the processor is configured to execute a program for reading and writing data stored in the memory to implement the method for reading and writing data according to the present disclosure.

In yet another aspect, the present disclosure relates to a computer-readable storage medium, on which one or more programs are stored, the one or more programs, when executed by one or more processors, implement the method for reading and writing data according to the present disclosure.

In some embodiments, since each block node in a designated physical storage space of the electronic device is used to store one data block, that is, the block node has a one-to-one mapping relationship with the data block. In addition, each data block cluster space has a cluster index, each block node has a block index, based on this, when reading and writing the target data block, by determining the target data block cluster space to which the target data block belongs, a target storage address corresponding to the target data block can be determined according to the starting address of the target data block cluster space, the spatial size of block nodes in the target data block cluster space and the block index of the target data block. In this process, only one sector needs to be retrieved to obtain spatial information such as the starting address of the target data block cluster space, thereby improving the addressing efficiency, and then improving the efficiency of data storage and retrieval. Based on this, applying the method for reading and writing data provided by some embodiments of the present disclosure in a blockchain scenario can improve the storage and retrieval efficiency of blockchain data.

DETAILED DESCRIPTION OF THE EMBODIMENTS

In order to make the purposes, technical aspects and advantages of the disclosed embodiments clearer, the technical aspects of the disclosed embodiments will be clearly and completely described below in conjunction with the accompanying drawings in the disclosed embodiments, and it will be apparent that the described embodiments are part of, but not all of, the embodiments of the disclosed embodiments. Based on the embodiments in the present disclosure all other embodiments obtained by those of ordinary skill in the art without making creative effort fall within the scope of protection of the present disclosure.

The method for reading and writing data provided by the present disclosure can be applied to an electronic device. In some embodiments, the electronic device herein may be a variety of types of devices, such as smartphones, tablets, laptops, desktops, servers, which are not specifically limited in this disclosure. To facilitate understanding of the embodiments of the present disclosure, a storage structure of a physical storage space of an electronic device is first described as below.

In the present disclosure, a file system is used to organize and allocate the physical storage space of an electronic device, and is responsible for data storage and data retrieval. In some implementations, the file system here may be a Filesystem in Userspace (abbreviated as FUSE), which is implemented and supported by a kernel module FUSE. Based on this, the data in the physical storage space of the electronic device can be managed and operated in an application layer.

At present, the minimum management unit of the file system is a "block" of physical storage space, and each "block" contains a set number of sectors, for example, containing 2, 4, 8, 16 sectors, etc.

In some embodiments, the set number here is related to the total capacity size of a physical storage medium, such as a disk, on the electronic device, that is, the number of sectors contained in each "block" is related to the total capacity size of the disk on the electronic device.

Figure 1:
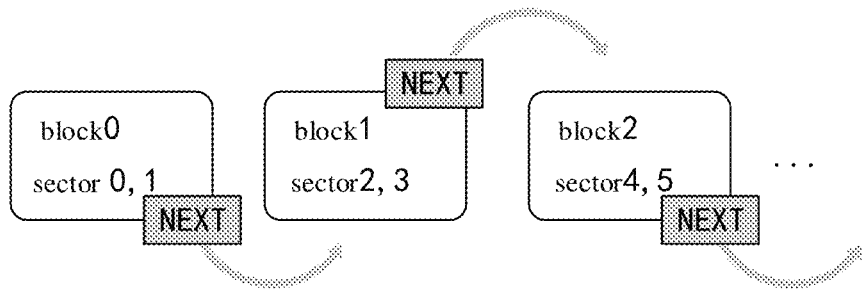
FIG. 1 illustrates an example of a mapping relationship between a "block" of a physical storage medium and a data block.

In some embodiments, the set number here may also be set by the user according to actual business requirements, for example, the user may set according to the size of the data block to be managed and operated. Taking blockchain as an example, assume that the size of a blockchain (understandably, a blockchain is a data block, hereinafter referred to as a block) is 1K, and assume that the size of a sector is 512 bytes, which means that the storage space of a block needs two sectors of physical storage media. Therefore, the above set number can be set to 2, that is, each "block" contains 2 sectors. FIG. 1 is an example of a mapping relationship between a block and a sector.

Thus it can be seen that each "block" for storing a data block can be realized by such processing, in other words, one to one mapping between the "block" of the physical storage medium and the data block can be realized by such processing.

In some current storage structures, such as relational database and blockchain KV database, it is difficult to ensure the continuity of data at a same acquisition point on physical storage media. To solve this problem, the present disclosure proposes, in certain embodiments, to divide a designated physical storage space of an electronic device into at least one data block cluster space, each data block cluster space including a plurality of block nodes (i.e., "blocks" as described above). The block nodes in one same data block cluster space are used for storing data blocks of one same acquisition point, thus ensuring the continuity of the data of the same acquisition point on the physical storage medium.

In some embodiments, block nodes in different data block cluster spaces may be used for storing data blocks of different acquisition points, or for storing data blocks at the same acquisition point.

In some embodiments, each data block cluster space includes the same number of block nodes, or each data block cluster space includes different numbers of block nodes. For example, the designated physical storage space of electronic device is divided into 100 data block cluster spaces, and each data block cluster space includes 1 million block nodes. For another example, the designated physical storage space of electronic device is divided into 100 data block cluster spaces, in which 50 data block cluster spaces include 1 million block nodes and the other 50 data block cluster spaces include 500,000 block nodes.

In some embodiments, a spatial size of block nodes included in each data block cluster space is the same. That is, the block nodes in each data block cluster space include the same number of sectors.

In some embodiments, for ease of addressing, an index is provided for each data block cluster space (hereinafter referred to as a cluster index), and an index is provided for block nodes included in each data block cluster space (hereinafter referred to as a block index).

In some embodiments, the value of the cluster index starts from 0, that is, the cluster index of the first data block cluster space is 0 (hereinafter referred to as data block cluster space 0), and the cluster indexes of other data block cluster spaces are incremented from 0. For example, the cluster index of the second data block cluster space is 1 (hereinafter referred to as data block cluster space 1), the cluster index of the third data block cluster space is 2 (hereinafter referred to as data block cluster space 2), and so on, which are not described in detail in this disclosure.

It should be noted that the above cluster index starting from 0 is only used as an example, not as a limitation.

In some embodiments, the value of the block index starts from 0, that is, for a specific data block cluster space, the block index of the first block node included therein is 0 (hereinafter referred to as Block Node 0, denoted as Block 0), and the block indexes of other block nodes are incremented from 0. For example, the block index of the second block node is 1 (hereinafter referred to as Block Node 1, denoted as Block1), the block index of the third block node is 2 (hereinafter referred to as Block Node 2, denoted as Block2), and so on, which are not described in detail in this disclosure.

It should be noted that the above block index starting from 0 is only used as an example, not as a limitation.

In some embodiments, for ease of addressing, for each data block cluster space, spatial information of this data block cluster space may be recorded at a designated location for a designated physical storage space. In some embodiments the designated location herein refers to a head space of a plurality of sectors starting from a starting sector of the designated physical storage space. For example, assuming that the starting sector of the designated physical storage space is the 1000th sector, and assuming that the designated physical storage space is divided into 100 data block cluster spaces, The spatial information of the data block cluster space 0 can be recorded in the head space of the 10000th sector. The spatial information of the data block cluster space 1 is recorded in the head space of the 10001st sector. The spatial information of the data block cluster space 2 is recorded in the head space of the 10002nd sector, and so on. The spatial information of the data block cluster space 99 is recorded in the head space of the 10099th sector. At the same time, this also means that the starting sector of the data block cluster space 0 is the 10100th sector.

In some embodiments, the spatial information at least includes a cluster index of the data block cluster space, a starting address, a spatial size of the block nodes in the data block cluster space, and a quantity of block nodes included in the data block cluster space. For example, taking the data block cluster space 0 as an example, the spatial information recorded in the head space of the 1000th sector is as follows:

ClusterIndex=0; //indicates that the cluster index is 0;
ClusterBeginAddr=10100; //indicates that the starting address is the address corresponding to the 10100th sector;
BlockSize=1024 bytes; //indicates that the block node has a spatial size of 1024 bytes;
ClusterBlockNumeber=1 million; //indicates that 1 million block nodes are included.

At this point, it can be known that Block0 in the data block cluster space 0 is mapped to the 10100th and 10101st sectors, Block1 is mapped to the 10102nd and 10103rd sectors, Block2 is mapped to the 10104th and 10105th sectors, and so on, which will not be described in detail in this disclosure.

Thus, for a specific data block cluster space, the mapping relationship between block nodes and sectors can be established through the block index of block nodes. This mapping relationship is shown in the following formula (I):

$$\text{Block}(N)=(\text{ClusterBeginAddr}+2N, \text{ClusterBeginAddr}+2N+1) \quad \text{formula (I)}$$

the above formula (I) that Block (N) is mapped to the (ClusterBeginAddr+2N)th and (ClusterBeginAddr+2N+1)th sectors.

In some embodiments, the starting address BlockAddr (N) of each block node may also be determined by the block index of the block node, which is determined by the following formula (II):

$$\text{BlockAddr}(N)=\text{ClusterBeginAddr}+N*\text{BlockSize} \quad \text{formula (II)}$$

The storage structure of the physical storage space of the electronic device in the embodiment of the present disclosure has been explained above. On the basis of the above description the method for reading and writing data provided in the present disclosure will be further explained in detail with reference to the accompanying drawings. It should be noted that the following embodiments do not constitute a limitation to the embodiments of the present disclosure.

Figure 2:
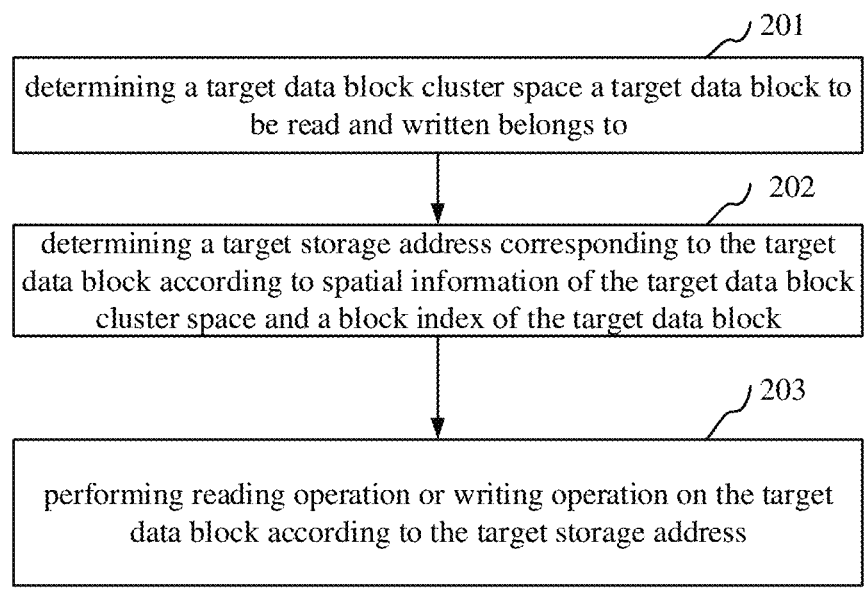
FIG. 2 illustrates a flowchart of a method for reading and writing data provided by an embodiment of the present disclosure.

Referring to FIG. 2, a flowchart of a method for reading and writing data provided by an embodiment of the present disclosure is shown. As shown in FIG. 2, the process includes:

201: determining a target data block cluster space to which a target data block to be read and written belongs;

202: determining a target storage address corresponding to the target data block according to spatial information of the target data block cluster space and a block index of the target data block, wherein the target data block comprises a blockchain; and 203: performing reading operation or writing operation on the target data block according to the target storage address.

In the present disclosure, a target data block to be read and written refers to a data block to be read from a designated physical storage space of an electronic device or a data block to be written to a designated physical storage space of an electronic device.

In some embodiments, the target data block includes a blockchain.

In certain embodiments, in the case of reading data blocks from the designated physical storage space of the electronic device, a user can send a data retrieval instruction to the electronic device according to the actual business requirements. The data retrieval instruction herein sent to the electronic device can be as follows: the user inputs retrieval information on a data retrieval page provided by the electronic device and clicks a button on the data retrieval page to trigger the data retrieval. When the electronic device detects that the button is clicked, it means that the electronic device receives the data retrieval instruction.

In some embodiments, the retrieval information may include a cluster index and block index of target data block. In these embodiments, the data block cluster space corresponding to the cluster index included in the retrieval information can be determined as the data block cluster space to which the target data block belongs (hereinafter referred to as the target data block cluster space), that is, the data block cluster space designated by the user can be determined as the target data block cluster space.

In certain embodiments, the retrieval information may include the block index of the target data block. In these embodiments, a pre-designated data block cluster space may be determined as the target data block cluster space, i.e., when a data block cluster space designated by a user does not exist, the pre-designated data block cluster space may be determined as the target data block cluster space. For example, when the designated physical storage space of the electronic device includes only one data block cluster space, the user may input only the block index of the target data block, that is, the retrieval information includes only the block index of the target data block.

In some embodiments, a data writing instruction may be sent to the electronic device in the event that a data block is written to a designated physical storage space of the electronic device.

In some embodiments, sending a data writing instruction to the electronic device herein may be that sending, by a user, a data writing instruction to the electronic device according to actual business requirements.

In some embodiments, sending the data writing instruction to the electronic device herein may be that generating, triggered by the electronic device itself, the data writing instruction In certain embodiments, generating, triggered by the electronic device itself, the data writing instruction can be: generating, periodically triggered by the electronic device itself, the data writing instruction, that is. the electronic device triggers to the generate the data writing instruction every set time interval, so that the electronic device can write the data block acquired in the latest set time interval into a designated physical storage space when the electronic device receives the data writing instruction. In some embodiments, the electronic device may trigger to generate a data writing instruction when the number of acquired data blocks reaches a set quantity, such as 1000, so that the electronic device writes the newly acquired set quantity of data blocks into a designated physical storage space when receiving the data writing instruction.

In some embodiments, the data writing instruction may carry a cluster index. In these embodiments, a data block cluster space corresponding to the cluster index included in a data writing instruction can be determined as a data block cluster space (hereinafter referred to as a target data block cluster space) to which a target data block to be written belongs.

In some embodiments, the cluster index of the data block cluster space carried in the data writing instruction may be set by the user, that is, the data block cluster space designated by the user is determined as the target data block cluster space.

In some embodiments, the cluster index of the data block cluster space carried in the data writing instruction may be set by the electronic device. In certain embodiments, The electronic device can pre-store the corresponding relationship between the acquisition point and the data block cluster space, based on which, the electronic device can determine the corresponding data block cluster space according to the acquisition point corresponding to the target data block to be written, and set the cluster index of the determined data block cluster space in the data writing instruction.

In some embodiments, the data writing instruction may also not carry a cluster index of the data block cluster space. In these embodiments, a pre-designated data block cluster space can be determined as a target data block cluster space. For example, when a designated physical storage space of the electronic device includes only one data block cluster space, it is not necessary for the data writing instruction to carry the cluster index of the data block cluster space.

As can be seen from the above description, in some embodiments, given the target data block cluster space, a recorded spatial information of the target data block cluster space can be obtained from the designated location of the above-mentioned designated physical storage space.

In some embodiments, the storage address recording the spatial information of the target data block cluster space may be determined by the following formula (III):

$$\text{Cluster}(N) = \text{BeginAddr} + N \qquad \text{formula (III)}$$

In the above formula (III), BeginAddr represents the starting sector of the designated physical storage space, such as the 1000th sector. Cluster (N) represents the starting sector of the data block cluster space N. For example, assuming that the target data block cluster space is a data block cluster space 5, based on formula (III), it can be obtained that the spatial information of the target data block cluster space 5 is recorded in the head space of the 10005th sector. Accordingly, spatial information of the target data block cluster space 5 can be acquired from the head space of the 10005th sector.

In certain embodiments, according to the related description of ab Formula (II) above, in this step 202, given the target data block cluster space to which the target data block belongs, the storage address (hereinafter referred to as the target storage address) corresponding to the target data block can be obtained by calculating a product of the spatial size of the block nodes in the target data block cluster space and the block index of the target data block, and then calculating a sum of the starting address of the target data block cluster space and the product.

It can be seen that the storage address corresponding to the target data block can be obtained by retrieving a sector, which improves the addressing efficiency.

In certain embodiments, in the case of reading data blocks from the designated physical storage space of an electronic device, taking a Filesystem in Userspace as an example, the electronic device calls a FUSE kernel module and the FUSE kernel module calls a read operation function to extract data blocks from the physical storage medium corresponding to the target storage address, and return the extracted data blocks as FUSE. FUSE calls the kernel operation again and returns the extracted data block to a user process.

In some embodiments, in the case of writing data blocks to the designated physical storage space of an electronic device, taking a Filesystem in Userspace as an example, the electronic device calls a FUSE kernel module, and the FUSE kernel module calls a write operation function to write the target data blocks to the physical storage medium corresponding to the target storage address.

As above, the description of the process shown in FIG. 2 is completed.

As can be seen from the above embodiment, since each block node in a designated physical storage space of the electronic device is used to store one data block, that is, the block node has a one-to-one mapping relationship with the data block. In addition, each data block cluster space has a cluster index, each block node has a block index, based on this, when reading and writing the target data block, by determining the target data block cluster space to which the target data block belongs, a target storage address corresponding to the target data block can be determined according to the starting address of the target data block cluster space, the spatial size of block nodes in the target data block cluster space and the block index of the target data block. In this process, only one sector needs to be retrieved to obtain spatial information such as the starting address of the target data block cluster space, thereby improving the addressing efficiency, and then improving the efficiency of data storage and retrieval. Based on this, applying the method for reading and writing data provided by some embodiments of the present disclosure in a blockchain scenario can improve the storage and retrieval efficiency of blockchain data.

Corresponding to the embodiment of the aforementioned method for reading and writing data, the present disclosure also provides an embodiment of an apparatus for reading and writing data.

Figure 3:
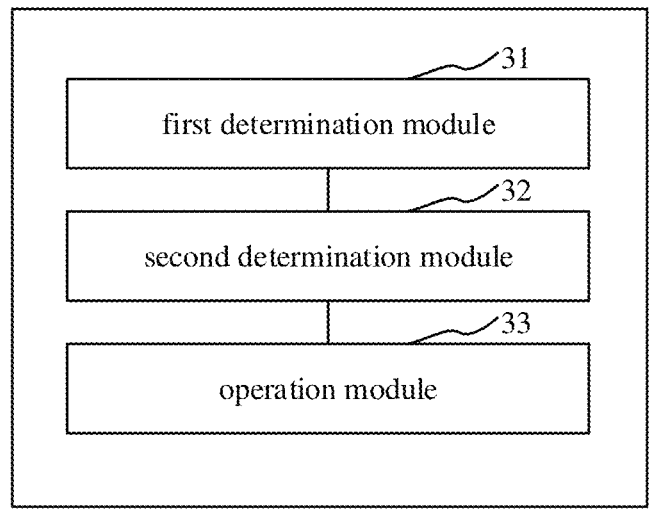
FIG. 3 illustrates a block diagram of an apparatus for reading and writing data provided by an embodiment of the present disclosure.

Referring to FIG. 3, a block diagram of an apparatus for reading and writing data provided by an embodiment of the present disclosure is shown. As shown in FIG. 3, the apparatus includes:

a first determination module 31, configured for determining a target data block cluster space a target data block to be read and written belongs to;

a second determination module 32, configured for determining a target storage address corresponding to the target data block according to spatial information of the target data block cluster space and a block index of the target data block; and an operation module 33, configured for performing reading operation or writing operation on the target data block according to the target storage address.

Figure 4:
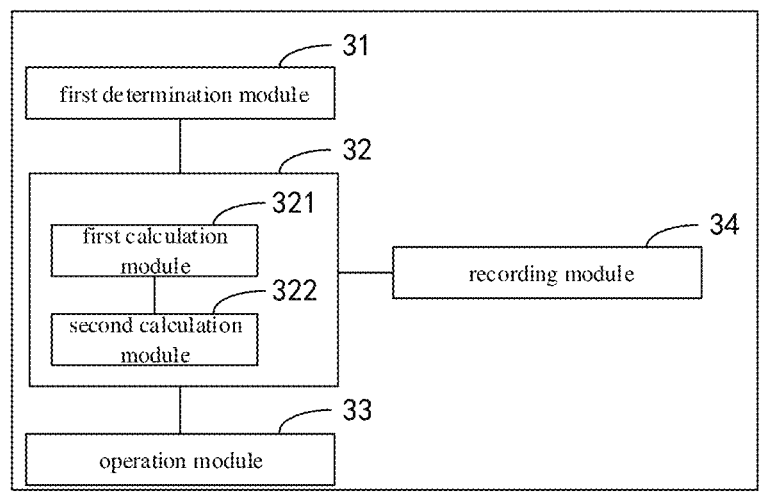
FIG. 4 illustrates a block diagram of another apparatus for reading and writing data provided by an embodiment of the present disclosure.

In some embodiments, as shown in FIG. 4, the apparatus further includes:

a recording module 34, configured for recording spatial information of the data block cluster space at a designated location of the designated storage space; the spatial information at least includes a starting address of the data block cluster space, a spatial size of the block nodes in the data block cluster space, and a quantity of the block nodes included in the data block cluster space.

In some embodiments, as shown in FIG. 4, the second determination module 32 includes:

a first calculation sub-module 321, configured for calculating a product of a spatial size of the block nodes in the target data block cluster space and the block index of the target data block; and a second calculation sub-module 322, configured for calculating a sum of a starting address of target data block cluster space and the product, determining a calculation result as the target storage address corresponding to the target data block.

In some embodiments, the first determination module 31 is configured for:

determining a data block cluster space designated by a user as the target data block cluster space the target data block to be read and written belongs to; or, determining a pre-designated data block cluster space as the target data block cluster space the target data block to be read and written belongs to when a data block cluster space designated by the user does not exist.

In some embodiments, each data block cluster space comprises the same number of block nodes, or each data block cluster space comprises different numbers of block nodes; and a spatial size of block nodes included in each data block cluster space is the same.

In some embodiments, block nodes in one same data block cluster space are used for storing data blocks of one same acquisition point.

Figure 5:
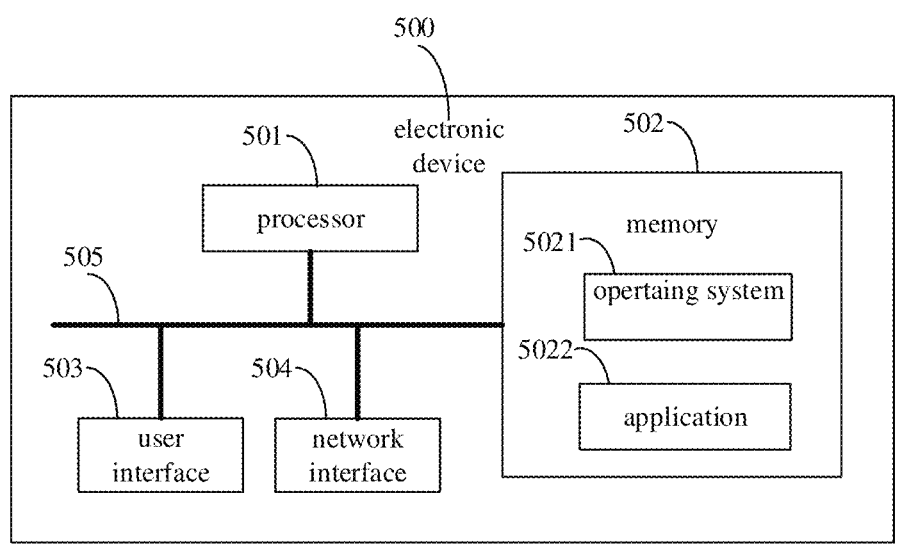
FIG. 5 illustrates a schematic structural diagram of an electronic device provided by an embodiment of the present disclosure.

FIG. 5 illustrates a schematic structural diagram of an electronic device provided by an embodiment of the present disclosure. The electronic device 500 shown in FIG. 5 includes at least one processor 501, a memory 502, at least one network interface 504, and other user interfaces 503. The various components in the electronic device 500 are coupled together by a bus system 505. A bus system 505 is used to implement connection communication between these components. Bus System 505 includes a power bus, a control bus and a status signal bus in addition to a data bus. However for clarity the various buses are all designated as the bus system 505 in FIG. 5.

In some embodiments the user interface 503 may include a display a keyboard or a click device, for example, a mouse, a trackball, a touch pad or a touch screen etc.

In some embodiments, the memory 502 may be a volatile memory or a non-volatile memory or may include both volatile and non-volatile memory. The non-volatile memory may be a read-only memory (ROM), a programmable rOM (PROM), an erasable PROM (EPROM), an electrically erasable EPROM (EEPROM), or a flash memory. The volatile memory may be a random access memory (RAM) which serves as an external cache. By way of illustration but not limitation, Many forms of RAM are available, such as Static RAM (SRAM), Dynamic RAM (DRAM), Synchronous DRAM (SDRAM), Double Data Rate SDRAM (DDRSDRAM), Enhanced SDRAM (ESDRAM), Synchlink DRAM (SLDRAM), and Direct Rambus RAM (DR-RAM). The memory 502 described herein is intended to include but not limited to these and any other suitable types of memory.

In some embodiments, the memory 502 stores elements below, executable units or data structures or a subset of them or an extended set of them: an operating system 5021 and an application 5022.

In some embodiments, the operating system 5021 includes various system programs such as a framework layer, a core library layer, a driver layer, used for implementing various basic services and handling hardware-based tasks. The application 5022 includes various applications such as a Media Player, a Browser, used for implementing various application services. A program implementing the method of the present disclosure can be included in the application 5022.

In some embodiments, the processor 501 is configured to perform the method provided by the present disclosure by invoking programs or instructions stored in memory 502, which may be programs or instructions stored in application 5022, for example, the method includes:

determining a target data block cluster space a target data block to be read and written belongs to:

determining a target storage address corresponding to the target data block according to spatial information of the target data block cluster space and a block index of the target data block; and performing reading operation or writing operation on the target data block according to the target storage address.

The methods disclosed in the above-described embodiments of the present disclosure may be applied to the processor 501, or implemented by the processor 501. The processor 501 can be an integrated circuit chip having signal processing capability. In a process of implementation, the steps of the above method may be accomplished by integrated logic circuitry of hardware in the processor 501 or by instructions in the form of software. The processor 501 described above may be a general purpose processor, a Digital Signal Processor (DSP), an Application Specific Integrated Circuit (ASIC), a Field Programmable Gate Array (FPGA), or another programmable logic device, a discrete gate or transistor logic device, or a discrete hardware component. The disclosed methods, steps, and logic block diagrams in the disclosed embodiments may be implemented or performed. The general processor may be a microprocessor or the processor may be any conventional processor or the like. The steps of the method disclosed in combination with the embodiment of the present disclosure can be directly embodied as the completion of the execution of the hardware decoding processor or the completion of the combined execution of the hardware and software units in the decoding processor. The software unit may be located in a storage medium mature in the art such as a random access memory, a flash memory, a read-only memory, a programmable read-only memory, an electrically erasable programmable memory, registers. The storage medium is located in the memory 502, and the processor 501 reads the information in the memory 502 and completes the steps of the above method in combination with its hardware.

It will be appreciated that the embodiments described herein may be implemented in hardware software firmware middleware microcode or a combination thereof. For hardware implementation, the processing unit may be implemented in one or more Application Specific Integrated Circuits (ASIC), Digital Signal Processor (DSP), Digital Signal Processing Device (DSPD), Programmable Logic Device (PLD), Field-Programmable Gate Array (FPGA), general purpose processor, controller, microcontroller, microprocessor, other electronic units for performing the functions described in the present disclosure, or a combination thereof.

For software implementation, the techniques described herein may be implemented by units that perform the functions described herein. The software code may be stored in memory and executed by a processor. The memory can be implemented in the processor or outside the processor.

The electronic device provided by the present disclosure may be the electronic device as shown in FIG. 5, and can execute the method for reading and writing data as shown in FIG. 2, thereby realizing the technical effect of the method for reading and writing data shown in FIG. 2. For concise description, please refer to the related description of FIG. 2 which will not be described repeatedly here.

The present disclosure also provides a computer readable storage medium. The storage medium here stores one or more programs. The storage medium may include a volatile memory such as a random access memory; the memory may also include a non-volatile memory such as a read-only memory, a flash memory, a hard disk or a solid-state disk; the memory may also include a combination of the above-mentioned kinds of memories.

One or more programs in the storage medium may be executed by one or more processors to implement the method for reading and writing data executed on the electronic device side described above.

The processor is configured to execute a data read-write program stored in the memory to implement the following data read-write methods executed on the electronic device side:

determining a target data block cluster space a target data block to be read and written belongs to;

determining a target storage address corresponding to the target data block according to spatial information of the target data block cluster space and a block index of the target data block; and performing reading operation or writing operation on the target data block according to the target storage address.

Professionals should be able to further realize that, the elements and algorithmic steps of each example described in connection with the embodiments disclosed herein can be implemented in an electronic hardware, a computer software, or a combination of both, and the composition and steps of each example have been described functionally generally in the above description in order to clearly illustrate the interchangeability of hardware and software. Whether these functions are performed in hardware or software depends on the specific application and design constraints of the technical scheme. Those skilled technicians may use different methods for each particular application to implement the described functionality but such implementation should not be considered outside the scope of the present disclosure.

The steps of the method or algorithm described in connection with the embodiments disclosed herein may be implemented in hardware, a software module executed by a processor, or a combination of both. The software module may be placed in random access memory (RAM), memory, read only memory (ROM), electrically programmable ROM, electrically erasable programmable ROM, registers, hard disk, removable disk, CD-ROM, or any other form of storage medium known in the art.

The specific embodiments described above further described the purpose, technical scheme and beneficial effects of the present disclosure in detail. It is to be understood that the foregoing is only a specific embodiment of the present disclosure and is not intended to limit the scope of protection of the present disclosure. Any modifications, equivalents, modifications, etc. made within the spirit and principles of the present disclosure shall be included within the scope of protection of the present disclosure.

The invention claimed is:

1. A method for reading and writing data, applied to an electronic device, wherein a designated physical storage space of the electronic device is divided into at least one data block cluster space, each data block cluster space comprises a plurality of block nodes, each block node is used for storing a data block, the method comprises:
   determining a target data block cluster space a target data block to be read and written belongs to;
   determining a target storage address corresponding to the target data block according to spatial information of the target data block cluster space and a block index of the target data block, wherein the target data block comprises a blockchain; and
   performing reading operation or writing operation on the target data block according to the target storage address;
   wherein determining the target storage address corresponding to the target data block according to spatial information of the target data block cluster space comprises:
   calculating a product of a spatial size of the block nodes in the target data block cluster space and the block index of the target data block; and
   calculating a sum of a starting address of target data block cluster space and the product, determining a calculation result as the target storage address corresponding to the target data block.

2. The method of claim 1, further comprising:
   recording spatial information of the data block cluster space at a designated location of the designated storage space; the spatial information at least comprises a cluster index of the data block cluster space, a starting address of the data block cluster space, a spatial size of the block nodes in the data block cluster space, and a quantity of the block nodes included in the data block cluster space.

3. The method of claim 1, wherein determining the target data block cluster space the target data block to be read and written belongs to comprises:
   determining a data block cluster space designated by a user as the target data block cluster space the target data block to be read and written belongs to; or, determining a pre-designated data block cluster space as the target data block cluster space the target data block to be read and written belongs to in response to a data block cluster space designated by the user not existing.

4. The method of claim 1, wherein each data block cluster space comprises the same number of block nodes, or each data block cluster space comprises different numbers of block nodes; and
   a spatial size of block nodes included in each data block cluster space is the same.

5. The method of claim 1, wherein block nodes in one same data block cluster space are used for storing data blocks of one same acquisition point.

6. An electronic device, comprising: a processor and a memory, wherein the processor is configured to execute a program for reading and writing data stored in the memory to implement the method for reading and writing data of claim 1.

7. A non-transitory computer-readable storage medium, on which one or more programs are stored, wherein the one or more programs, in response to being executed by one or more processors, implement the method for reading and writing data of claim 1.

* * * * *